(12) United States Patent
Rao et al.

(10) Patent No.: US 8,675,550 B2
(45) Date of Patent: Mar. 18, 2014

(54) METHOD FOR BACKHAUL INTERFERENCE MANAGEMENT WITH ACCESS TERMINAL ROUTER

(75) Inventors: Sudarshan A Rao, Karnataka (IN); Subramanian Vasudevan, Morristown, NJ (US); Jialin Zou, Randolph, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/319,094

(22) Filed: Dec. 31, 2008

(65) Prior Publication Data

US 2009/0310527 A1    Dec. 17, 2009

Related U.S. Application Data

(63) Continuation-in-part of application No. 12/286,417, filed on Sep. 30, 2008, now Pat. No. 8,520,559.

(60) Provisional application No. 61/131,953, filed on Jun. 14, 2008.

(51) Int. Cl.
    *H04W 4/00* (2009.01)
(52) U.S. Cl.
    USPC .......................................................... 370/328
(58) Field of Classification Search
    USPC ......... 370/252, 278, 281, 261, 331, 336, 310, 370/328, 342, 350, 356, 352, 337, 314, 330, 370/347, 321
    See application file for complete search history.

(56) References Cited

U.S. PATENT DOCUMENTS

| 6,608,823 | B1 | 8/2003 | Kito |
| 6,615,271 | B1 * | 9/2003 | Lauck et al. ................. 709/232 |
| 7,526,012 | B2 | 4/2009 | Shimizu et al. |
| 7,623,863 | B2 | 11/2009 | Chen et al. |
| 7,650,150 | B1 * | 1/2010 | Gerakoulis et al. ........... 455/450 |
| 8,014,334 | B2 | 9/2011 | Lee et al. |
| 8,254,341 | B2 | 8/2012 | Seki |
| 2005/0192037 | A1 * | 9/2005 | Nanda et al. .................. 455/509 |
| 2006/0120436 | A1 | 6/2006 | Komatsu |
| 2007/0211749 | A1 * | 9/2007 | Benveniste .................... 370/445 |
| 2007/0248052 | A1 | 10/2007 | Nagaraj et al. |

(Continued)

FOREIGN PATENT DOCUMENTS

| EP | 1830522 A1 * | 9/2007 | ............. H04L 12/46 |
| JP | 4260228 A | 9/1992 | |

(Continued)

OTHER PUBLICATIONS

Examiner's Office Letter issued in Japanese Patent Application No. 2011-513508; Inventor: Rao; Method for Backhaul Interference Management With Access Terminal Router; Dec. 13, 2012, pp. 1-7.

*Primary Examiner* — Kevin C Harper
*Assistant Examiner* — Samina Choudhry
(74) *Attorney, Agent, or Firm* — Wolff & Samson PC (57) ABSTRACT

An enhanced access terminal (AT) that can serve as a "proxy wireless over-the-air backhaul or relay" is provided, to connect a base station with no backhaul to its neighboring fully functional base station that is connected to the NMS. In a further embodiment, an architecture and protocol for storing and retrieving data at the base station lacking backhaul is provided, and, using that information, a mechanism by which the ATR can communicate the format information to the source to improve interference cancellation at the base station lacking backhaul, and neighboring base stations, due to backhaul transmission from the AT's routing and relaying capability.

19 Claims, 5 Drawing Sheets

(56) References Cited

U.S. PATENT DOCUMENTS

2008/0090575 A1* 4/2008 Barak et al. .................. 455/444
2008/0247372 A1* 10/2008 Chion et al. .................. 370/338
2009/0231989 A1* 9/2009 Larsson et al. ............... 370/201
2009/0325605 A1* 12/2009 Cha et al. .................... 455/456.2

FOREIGN PATENT DOCUMENTS

| JP | 2005117247 A | 4/2005 |
| WO | WO03101132 | 4/2003 |
| WO | 2004102891 A1 | 11/2004 |
| WO | PCTUS2009003556 | 12/2009 |

* cited by examiner

METHOD FOR BACKHAUL INTERFERENCE MANAGEMENT WITH ACCESS TERMINAL ROUTER

RELATED APPLICATION

This application is a continuation in part of U.S. patent application Ser. No. 12/286,417, filed Sep. 30, 2008, published U.S. Pat. No. 8,520,559 as U.S. Published Application No. 20090252088, the subject matter thereof being fully incorporated herein by reference. This application further claims priority pursuant to 35 U.S.C. Sec 119(e) to U.S. Provisional Application No. 61/131,953, filed Jun. 14, 2008, entitled METHOD FOR BACKHAUL INTERFERENCE MANAGEMENT WITH ACCESS TERMINAL ROUTER, the subject matter thereof being fully incorporated herein by reference.

FIELD OF THE INVENTION

The invention is related to communication systems and more particularly to systems and methods for routing traffic in wireless communication systems.

BACKGROUND OF THE INVENTION

Figure 1:
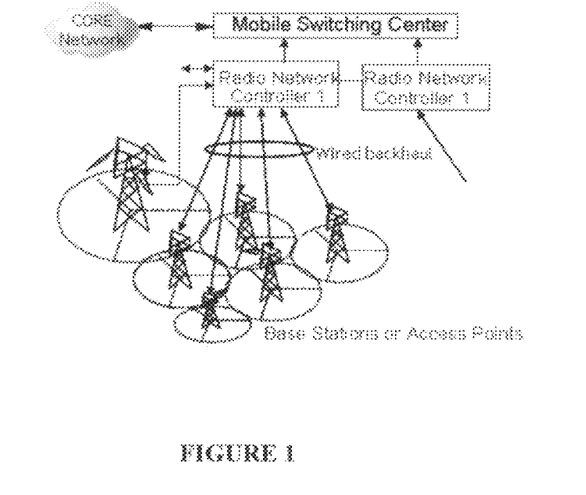
FIG. 1 provides a schematic illustration of an hierarchical wireless network

A traditional wireless access network consists of a number of base stations (access points) connected to a centralized controller (radio network controller/base station controller) using wired links (copper, co-axial cable, fiber). The radio network controllers are connected back to circuit-switches or packet-data routers which in turn connect to the wired telecommunications infrastructure (the core network). This traditional, hierarchical network is shown in FIG. 1.

In typical base station deployments in current networks, a wired connection is usually required from each base station to the controller and then onwards to the core network. In the vast majority of cases, these wired links are T1, E1, Ethernet or fiber links. In some rare cases, specialized dedicated line-of-sight microwave links are employed that use separate spectrum. Implementation of such dedicated backhaul connections is usually expensive. There may also be pairs of base stations in an existing network for which a dedicated backhaul connection can not be reliably or economically implemented. It is therefore worth considering alternative approaches to reducing backhaul costs. One such alternative is to somehow provision wireless backhaul links between the base stations themselves and thereby provide the backhaul communications path. Furthermore, it would be desirable not to dedicate separate spectrum and specialized equipment for such backhaul.

In the case of fault isolation and trouble-shooting of base-stations, techniques in current cellular networks rely on the ability of the network operators to correlate information from many diverse sources. Quite often, the back-haul connection is leased from third-party service providers. Many times, when a lack of service is detected from a base-station, the root-cause cannot be clearly isolated to the wired network or the base-station RF chain for several hours, if not longer. There is no other mechanism available today to log-in to affected base-stations remotely when a backhaul may be malfunctioning. A site visit is required by a technician to confirm or rule out a mal-functioning base-station. This very expensive site visit could be avoided if another mechanism were made available to diagnose base-stations remotely.

Further, the actual numbers of infrastructure nodes (base stations or access points) is likely to increase by a few orders of magnitude. Typically, each of the large service provider networks today consist of in excess of 50,000 cells sites at which base stations are located. It is not unrealistic to expect such numbers to grow by a factor of 100 to about 5 million. Such large number of base stations will be needed to ensure truly ubiquitous data coverage. It is also likely that many of these new access points cannot be easily supported with a wired backhaul to the core network.

SUMMARY OF INVENTION

To address the problems described in the Background section, a methodology for routing packets via an access terminal (AT) between base stations (access points), using wireless technology, is disclosed.

In an exemplary embodiment, the access-terminal routing capability may be used to provide a wireless, meshed backhaul between base stations using existing wireless-access resources (time, bandwidth, code-space, power), protocols, and base station infrastructure. Thus, a means to extend the coverage of existing networks by adding standalone base stations without wired or specialized wireless backhaul is provided.

Essentially, with the methodology of the invention, an AT can serve as a "proxy router" when called upon to do so. The ability to use the AT to route packets between base-stations provides added flexibility to configure and control base-stations and also redundancy in case existing backhaul is congested or broken.

In a further embodiment, the AT routing and relaying capability provided by the invention may be extended to new OFDM based air-interface technologies being considered for $4^{th}$ generation cellular standards such as LTE, UMB and WiMAX. In particular, a new backhaul routing protocol is provided for the ATR by modifying the HRPD protocol stack. The ATR supports parallel self traffic flows and backhaul flows simultaneously. The backhaul traffic flow and self traffic flow are differentiated by a traffic type indication. The QoS of the ATR backhaul stream is supported. The inbound and outbound ATR backhaul traffic flows and the ATR self traffic can be transmitted simultaneously. Walsh codes are employed to separate the concurrently transmitted parallel streams from an ATR. Independent power controls are applied to different air links when an ATR conducts parallel transmissions over different air links. The backhaul traffic from a standalone base station is thus routed to a base station connected with an RNC. The ATR backhaul stream could be negotiated through a simple request/response mechanism.

Wireless Access Terminal Router (ATR) implementation on HRPD RevB enables the capability of centralized backhaul, provides low cost edge coverage and low cost femto solutions at the air interface with HRPD. The features with generic nature could also be applied to other radio access technologies. The invention could provide significant cost savings for various applications and lead to a brand new business model.

Although the ATR relay provides numerous advantages, the transmitted ATR signal also constitutes interference to the source BTS (i.e., the BTS lacking a wired backhaul attempting to make a relay connection via the ATR to the target BTS) and other nearby BTSs, especially when the ATR is near those BTSs. Accordingly, in a further embodiment of the invention, an architecture and protocol for storing and retrieving the data at the source is provided, and, using that information, a mechanism by which the ATR can communicate the format information to the source to improve interference cancellation is disclosed.

DETAILED DESCRIPTION OF THE INVENTION

In the parent application (U.S. Ser. No. 12/286,417) for this continuation in part application, the inventors disclosed a new wireless relay function implemented in a wireless mobile unit, identified as a wireless Access Terminal Router (ATR). The present continuation-in-part application is directed to an application of that ATR relay function in the management of interference in a wireless system.

With the ATR concept, the mobile unit is not only in communication with base stations for its own traffic, but also carries the backhaul traffic from one or more base stations which stand alone and do not have wire/backhaul connection with networks. The ATR concept is schematically illustrated in FIG. 1. As illustrated in the figure, a base station (BTS) not having a wired backhaul can arrange a relay of its traffic via an ATR to a target BTS having a wired backhaul.

The ATR functions are, however, not presently supported in the High Rate Packet Data (HRPD) air interface standard. A new ATR backhaul protocol for HRPD is disclosed by the inventors in a companion application filed concurrently herewith, entitled "Access Terminal Router Implementation On Enhanced HRPD" (U.S. application Ser. No. 12/319,117), and the contents thereof are incorporated herein by reference.

The ATR supports parallel self-traffic flows and backhaul flows simultaneously. Power control and resource allocation are used to support the QoS of the ATR backhaul flows. For a BTS not having a wired backhaul traffic link to a target BTS, the backhaul traffic from the un-wired BTS can be routed to the target BTS via an ATR. The ATR backhaul stream can be negotiated through a simple request/response mechanism, as described more fully in the parent application hereof and in the companion application referenced above.

The ATR is power or rate controlled by the target BTS. The transmission power of the ATR is scaled to meet the requirement of the target BTS. However, the transmitted ATR signal also constitutes interference to the source BTS (i.e., the BTS lacking a wired backhaul attempting to make a relay connection via the ATR to the target BTS) and other nearby BTSs, especially when the ATR is near those BTSs. Interference cancellation (IC) at the source BTS and other BTSs near the forwarding ATR is accordingly desired. As will be seen herein, the IC method disclosed here by the inventors will address this need, but that method can also be generalized for generic wireless relay scenarios.

It is known that the transmission of from an AT will be the interference to signals received at the BTSs from other ATs. The similar interference generated by the ATR backhaul transmission is denoted as the "blow-back" to the BTS which originally transmitted the backhaul traffic to the ATR. In the companion application referenced above, it was shown that the blow-back from the ATR transmission to the target BTS at the source BTS could be cancelled since the source BTS generated this data, and could readily store the data for use in determining interference cancellation. In the present application the inventors disclose a new method to further enhance the performance of such interference cancellation both at the source and neighboring base stations that are impacted by such interference.

Even though the source BTS may have generated the data, the actual transmission format for the ATR transmission to the target BTS will not be known at the source BTS. Additionally, the timing of this transmission is not known exactly. In the absence of timing and transmission format information, the recovery of the information at the source BTS for interference cancellation relies on hypothesis testing across a range of times and transmission formats.

To address those limitations of the existing art, the inventors disclose herein (i) an architecture and protocol for storing and retrieving the data at the source, and (ii) the creation of a mechanism by which the ATR can communicate the format information to the source to improve IC. The inventors further disclose a modification of power control rules that enable the modulation configuration information broadcast from the ATR to be made available to neighboring BTSs as well.

The original source BTS data can be used to cancel the interference when the ATR relay transmits the data. Since there is delay in respect to the data transmitted from the source BTS to the ATR relay and from the ATR transmission to the target BTS, it is possible for a neighboring BTS to obtain the source data through wired backhaul (if it is wired and the source BTS is wired) or the air link before the relay transmits those data. The neighboring BTS's interference cancellation for the interference caused by ATR thus becomes feasible. In particular, the inventors disclosed herein an architecture and protocol for storing the source data for IC at the source BTS and a mechanism for enabling the neighboring BTSs to monitor a source BTS, including interception of the source data when the source BTS transmits that data to the ATR. The source data intercepted by the neighboring BTSs will then be used for IC at the neighboring BTSs.

Mechanisms are also provided herein to support the mobility of ATRs according to the invention. With such support of ATR mobility, the backhaul resource of moving ATRs can be used by the system dynamically.

Wireless Backhaul Interference Cancellation at Source and Neighboring BTSs

Figure 2:
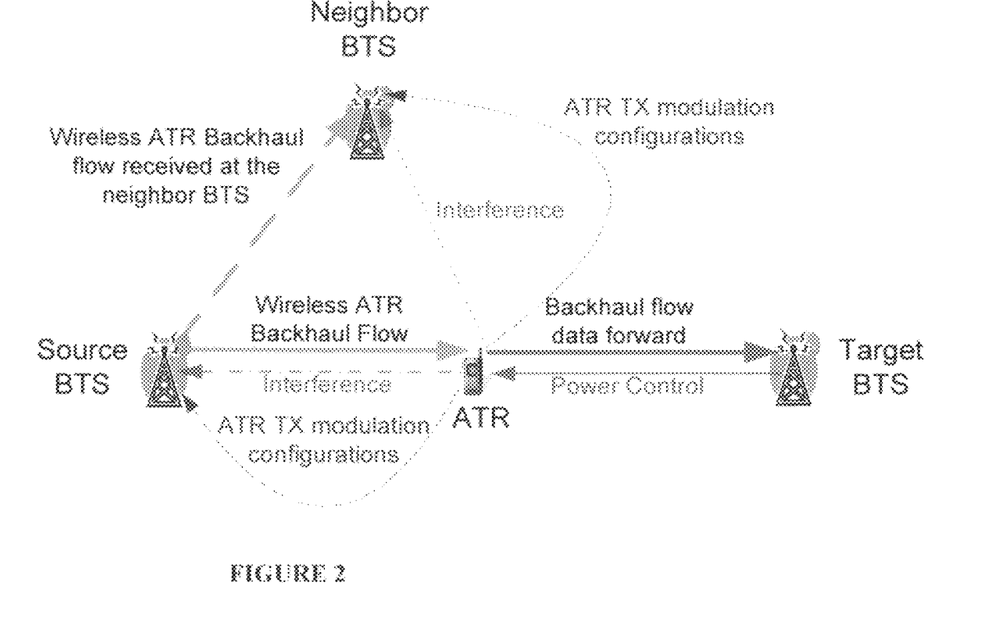
FIG. 2 schematically illustrates data and interference flows among an ATR and the source and neighboring BTSs, as addressed by the invention FIG. 3 schematically illustrates interference cancellation at source/neighboring BTSs related to wireless backhaul transmissions, according to the invention.

The data and interference flows among the ATR and the source and neighboring BTSs addressed by the invention are schematically illustrated in FIG. 2. As a preface to a detailed discussion of the methods and architecture of the invention, it will be helpful to outline certain basic assumptions, system structures and high level requirements germane to the implementation of the invention, which may also be usefully considered in the context of the data and interference flows illustrated in FIG. 2.

1. The ATR is power controlled by the target or next forwarding BTS. The power control is provided on per-flow and per-path bases, subject to the ATR's total transmission power constraint.
2. The average transmission rate through an end-to-end ATR backhaul path should be the same for each link of the relay transmission (e.g., from the source BTS to the ATR and from the ATR to the target BTS)

3. The ATR transmitter configurations, including the coding and modulation parameters can be delivered to the source and neighboring BTSs through the air link between the ATR and those BTSs.
4. Proper power allocation is applied for the ATR during broadcast of the ATR backhaul transmitter configuration information to enable receipt of that information over the air by the neighboring BTSs
5. The neighboring BTSs are notified by the source BTS of a relay transmission, allowing them to monitor and intercept the backhaul data sent from the source BTS to the ATR.
6. A delay will occur between the time that the source BTS transmits its data to the ATR and the transmission by the ATR of that data onward to the target BTS. This delay allows the source BTS to perform interference cancellation using the stored source data in order to cancel the interference from the ATRs onward transmission of that data to the target BTS. This delay will also allow the neighboring BTSs to perform interference cancellation using the intercepted data from the source BTS which would be received at the same time as the ATR receives the data.
7. When ATR transmittal of the wireless backhaul data flow follows the forward link format is one implementation option for the invention. Under this option, the BTSs receivers must have the capability to demodulate and decode in the forms of forward link and reverse link.

Figure 3:
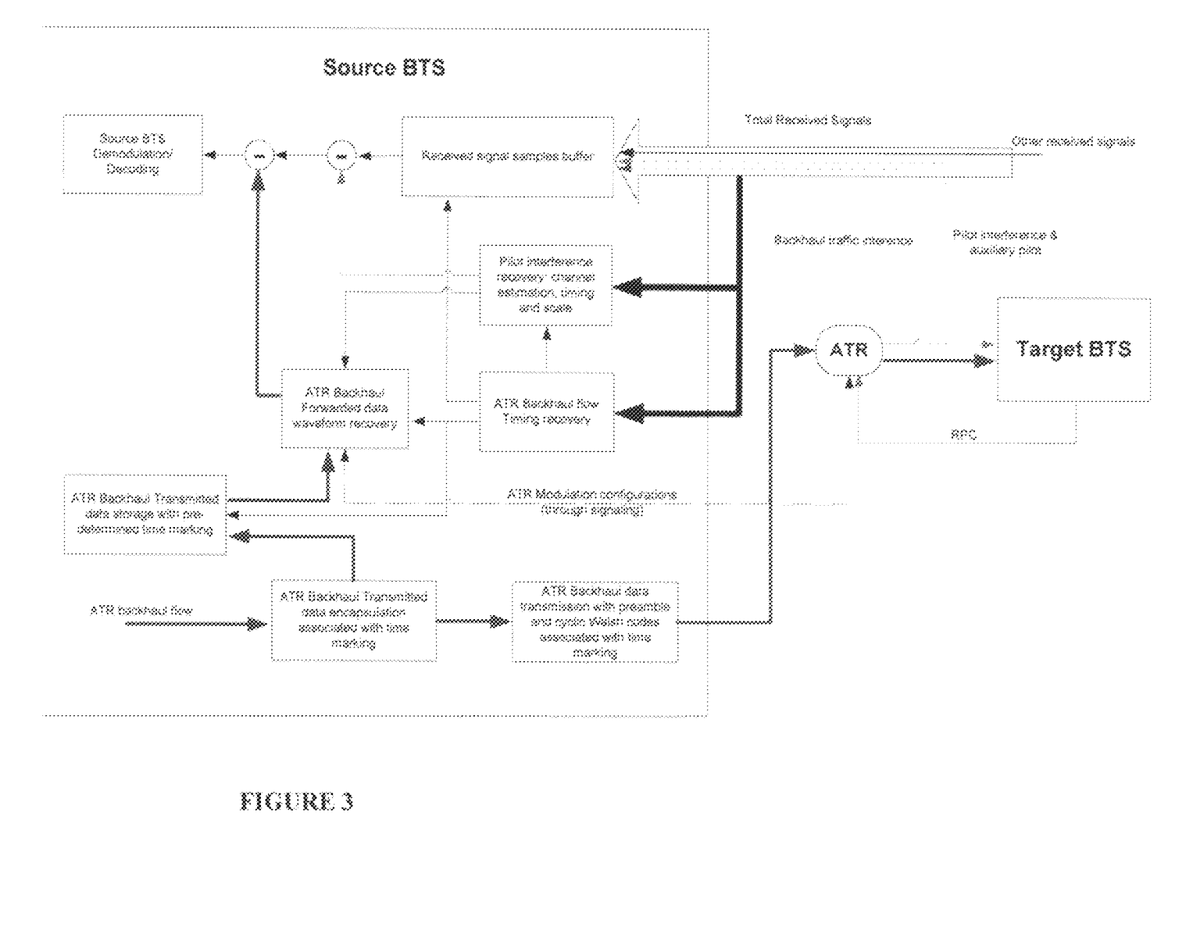

The invention method for interference cancellation at source/neighboring BTSs related to wireless backhaul transmissions is schematically depicted in FIG. 3. According to that method the source (or neighboring) BTS will detect and process the pilot transmitted by the ATR. Channel estimation is conducted based on the received ATR pilot to obtain the signal amplitude, phase and frequency changes due to the channel attenuation and the mobility of the ATR. The timing of the gating of the pilot is determined next based on the detected on/off edge of the pilot. Note that there maybe an auxiliary pilot which is on/off in-sync with the on/off of the ATR backhaul data transmission. The received ATR pilot waveform is then recovered, based on the prior knowledge of the modulation scheme, the reverse of the channel estimation results and the timing of the pilot gating. Finally, the pilot interference is removed from the total received signal samples based on the timing alignment determined by the timing recovery mechanism.

Figure 4:
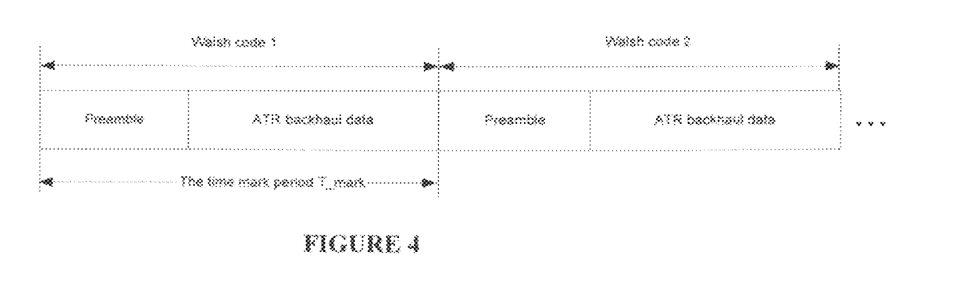
FIG. 4 illustrates the marking of data to be transmitted into T_mark periods by the source BTS.

To assist timing alignment between the ATR transmitter and the source/neighboring BTSs, the transmission rate is pre-negotiated over the whole ATR backhaul path. Based on the transmission rate, the source BTS will mark the data to be transmitted over the next time-mark period T_mark (e.g., 400 ms). The beginning and the end of the data are identified. A number with an associated Walsh code are assigned to the data corresponding to this T_mark period. An exemplary two periods of data so marked is illustrated in FIG. 4.

The marked data is stored at the source BTS with the associated number, along with the mapping of the time mark numbers with the Walsh codes. The mapping of the time mark numbers with the Walsh codes is also sent to and maintained at the ATR. In a preferred embodiment, that mapping data will be delivered to the ATR during the backhaul negotiation. The time-marked data itself will be transmitted to the ATR with the time-mark number at the beginning of every T_mark period.

When the ATR backhaul data is transmitted at the ATR, a preamble of a fixed pattern will be added for every T_mark. The Walsh code corresponding to the time-mark number will be modulated over the T_mark period of time. A backhaul flow reverse link auxiliary pilot may be transmitted to help the ATR reverse link power control for the wireless backhaul flows. If transmitted, the backhaul flow reverse link auxiliary pilot will also be used to help the timing recovery at the source BTS.

The ATR will send the backhaul flow transmitter configurations back to the source BTS, or even the neighboring BTSs, via a newly defined backhaul transmitter configuration message. The contents of the message may illustratively include the coding rate, modulation scheme parameters, TPR, etc. The transmitter configuration message may be sent by the ATR during the enabling backhaul route negotiation phase. In one embodiment, the transmitter configuration message may be sent using multicast techniques. After the ATR is selected by the source BTS, the source BTS will notify the neighboring BTSs of the ATR's identity.

After the source BTS has received acknowledgements from the neighboring BTSs of having received the notification from the source BTS of the selected ATR, the source BTS will advise the ATR to send out the transmitter configuration messages to the source and neighboring BTSs. The neighboring BTS being notified will also start to monitor for messages (either individually directed or multicast) sent from this ATR. The message could be sent over the reverse-link access channel or in a broadcast channel similar to the existing HRPD forward-link broadcast channel.

If the ATR decides to change its modulation behavior, it will send out a request to the source BTS with newly suggested transmitter configurations. The ATR will only start transmission using the new configuration after it has received an acceptance from the source BTS.

Timing recovery for the ATR backhaul flow is implemented via a preamble and Walsh detection mechanism that would be provided at each of the BTSs participating in interference-cancellation for a given ATR relay transmission—i.e., the source and neighboring BTSs. That mechanism will provide the time-mark timing and the associated time-mark number for each data transmission block. The timing and the time-mark information will be sent to the ATR backhaul data storage, which backhaul data storage is implemented as a buffer (storing the data originally transmitted to the ATR) residing in the source BTS and/or the participant neighboring BTSs. The data with the same time-mark will be read out to the waveform recovery block, which contains the algorithms to recover the ATR transmission waveform received at the source or neighboring BTS. The received ATR transmission waveform will be recovered based on the input of the original source BTS transmitted data, ATR transmission configurations, recovered timing information, and channel estimation. The timing information will also be sent to the waveform recovery block, the received signal sample buffer and the pilot recovery block to ensure the timing alignment over each time-mark period.

To enable waveform recovery respecting the ATR backhaul interference flow, the encoding and modulation at the ATR is re-performed at each of the BTSs participating in the interference cancellation operation, based on the ATR transmitter configurations sent from the ATR. Using the channel estimation determined from the ATR pilot signal, the channel attenuation at the ATR's amplitude, phase and frequency (Doppler) are applied by the participating BTSs to the recovered waveform.

Based on the time-mark timing information, the timing alignment between the received signal samples and a local modulated backhaul data waveform is achieved over the T_mark period of time. The recovered auxiliary pilot on/off information is used to achieve the frame level synchronization between the locally generated waveform and the received signal waveform samples.

Following the T_mark and auxiliary pilot timing information, the ATR backhaul data stored at the participating BTS, in local memory, will be read out and will be encoded, modulated and attenuated at the right timing (at the timing resolution of frame). Based on the received pilot strength, the strength of the recovered ATR backhaul signal waveform could be scaled and determined using the TPR information from the Traffic to Pilot Ratio ATR.

As will be seen in FIG. 3, the recovered pilot waveform and the ATR backhaul waveform will be removed from the received signal samples. After the interference from the ATR backhaul traffic and pilot is cancelled, the total received signals will be further processed for demodulation and decoding.

ATR Mobility

For ATR mobility, a basic assumptions is that there are ATR(s) owned by users that may switch to a different Tethered BTS for it to connect to a neighboring BTS without backhaul. Each BTS w/o backhaul (UWBTS) knows a route to BTS with backhaul. BTS broadcast indication and the AT know whether or not they have backhaul.

Figure 5:
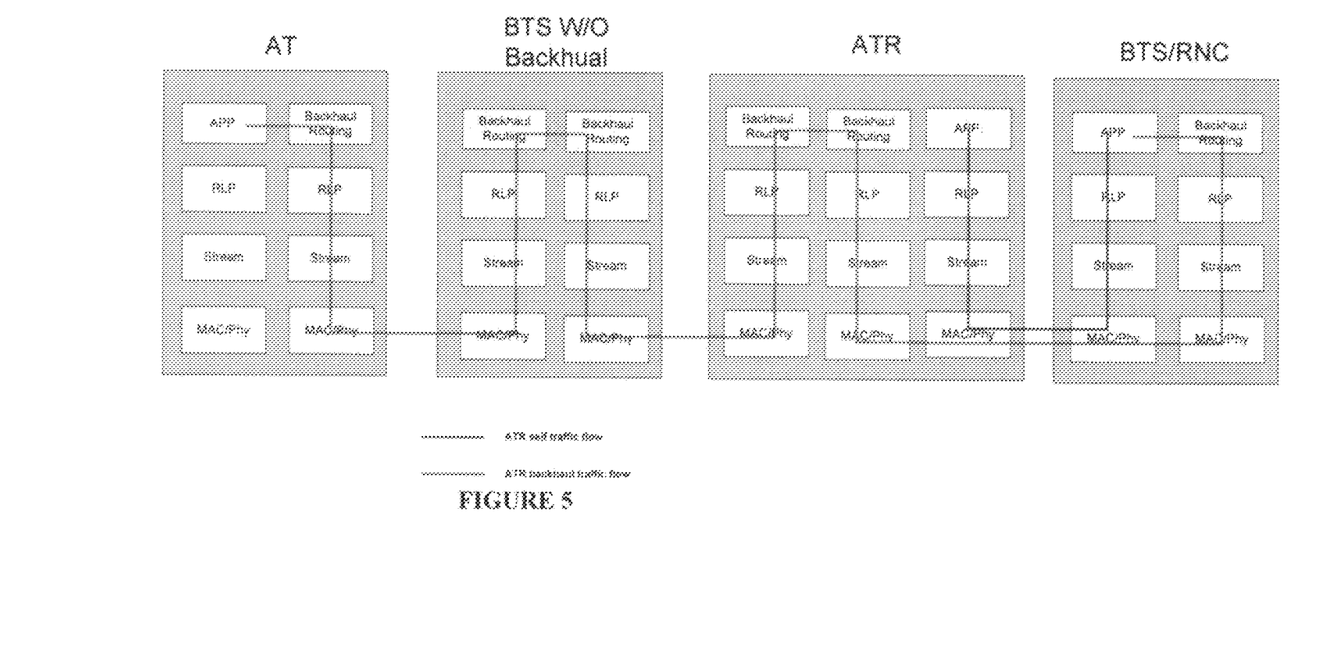
FIG. 5 schematically illustrates differentiation among the ATR backhaul flows and the ATR self flows under the ATR backhaul routing protocol of the invention.

The overall ATR backhaul routing function is schematically illustrated in FIG. 5. As will be seen in the "ATR" labeled block, the ATR operates to perform both the conventional AT function of direct communication between the AT and a BTS (illustrated in the rightmost column of functions in the block—"APP" "RLP" "Stream" and "MAC/Phy") and a relay function for communication between a BTS without backhaul (sometimes referred to herein as an unwired BTS or UWBTS) and a BTS with backhaul (sometimes referred to herein as a tethered BTS or T-BTS)—the function being illustrated by the two leftmost function columns of the "ATR" block.

The ATR backhaul routing protocol resides in the HRPD application layer and conducts the ATR backhaul flow encapsulation. The encapsulation functions include (a) adding the backhaul flow indication at the packet header and (b) adding the source and destination identification (pseudo noise (PN) code of the source and destination sector).

As illustrated in FIG. 5, the ATR backhaul routing protocol operates to differentiate the ATR backhaul flows and the ATR self flows. That operation includes separating the backhaul flows into separate stream/flow—i.e., when there is backhaul traffic to be handled, a separate stream will be used from the stream for normal AT traffic. To support the flow differentiation, a dedicated protocol stack instance and RLP are provided for each air link between the ATR and the BTS without backhaul, the ATR and the BTS with backhaul, and the AT and either the BTS with or without backhaul.

Further, the RLP flows in the backhaul stream operate at each air interface and support the QoS for the stream based on the QoS at the flow source. Store and forward capability is expected to function together with the RLP.

In performing its routing function, the ATR operates to route the flow either to the addressed application or just performs pass-through based on the self/backhaul indication of the flows. To assist such routing, the ATR should be informed about the nearby BTSs with backhaul connections to an RNC as well as for un-wired BTSs, which information can be provided either by broadcast indication or unicast indication.

For transmission of its own application traffic, an AT should try to connect to a BTS with backhaul connection (T-BTS) first. If no T-BTS is found with an adequate air link, then the AT should try to connect with an un-wired BTS (UWBTS). After a traffic channel with the UWBTS is enabled, the AT should take the PN code of the T-BTS with the relative best air link to this AT/ATR as the destination PN. A MACID is assigned to the AT from the UWBTS. The destination PN embedded in the source flow header for the original source AT operates to indicate its desired target T-BTS.

A UWBTS should maintain a list of the nearby T-BTSs with their associated sector PNs. When a UWBTS receives an application flow from a source AT, it determines a route to a T-BTS and broadcasts the backhaul connection request for the next destination with PNx first PNx first (where PNx is the identity of an available neighboring sector nearby selected by the UWBTS that may connect to the intended destination). If a nearby ATR offers a backhaul connection to PNx, the negotiation procedure for the ATR backhaul should be started. If no nearby ATR offers the backhaul connection to PNx, the UWBTS should broadcast an ATR backhaul request with PNy of another T-BTS sector (where PNy is the identity of the next available neighboring sector selected by the UWBTS that may assist in routing to the intended destination), till an ATR backhaul is found for connection to a T-BTS.

The destination sector PN embedded in the ATR backhaul request is used by the ATR to acquire the pilot of the next destination sector. For the inbound traffic flow—inbound referring to flow towards a T-BTS from an UW-BTS via an ATR, the destination sector is a sector of the T-BTS. For the outbound traffic flow—outbound referring to flow away from T-BTS towards an UW-BTS via an ATR, the destination sector is a sector of the UWBTS linked to the source AT. When the UWBTS encapsulates the inbound ATR backhaul packets, it should include the source sector PN (i.e., its own PN). The destination PN need not be included in the packet header for an ATR that only serves one destination T-BTS. The ATR will have already obtained the PN of the destination T-BTS via the ATR backhaul request. However, for an ATR that serves more than one destination T-BTS, the destination PN should be included in the packet header.

The source-sector PN of the un-wired BTS sector will be required by the T-BTS. The T-BTS will use that source sector PN as the destination PN to encapsulate the packet and send back to the UWBTS. Note, though, that the T-BTS may not need to include the source sector PN when it conducts the encapsulation for the ATR backhaul packets.

The source-sector PN of the un-wired BTS sector will be required by the T-BTS. The T-BTS will use that source sector PN as the destination PN to encapsulate the packet and send back to the UWBTS. Note, though, that the T-BTS may not need to include the source sector PN when it conducts the encapsulation for the ATR backhaul packets.

In carrying out the ATR backhaul flow negotiation, the ATR should send Route Update Message (RUM) following the existing HRPD rule.

When a connection is enabled from a source AT to an UWBTS, the UWBTS will send a broadcast ATR backhaul request (solicitation) with the destination PN. The initial ATR backhaul request sent by the UWBTS will include the destination PN indicated by the source AT. If the AT preferred destination PN is not reachable through an ATR backhaul, the UWBTS will send the request again with alternative destination PN.

While the source AT is connected with the UWBTS, it could keep sending the preferred destination PN. If the current destination PN of the available ATR backhaul is not the one the source AT preferred, the UWBTS may send the request again with the desired destination PN. Alternatively, while the source AT is connected with the UWBTS, the source AT may change its preferred destination PN, similarly causing the UWBTS to send the request again with the new destination PN.

When an ATR has received the ATR backhaul request message from the UWBTS, it will measure the pilot of the destination PN. If the pilot of the destination PN is not strong enough (above a threshold), the ATR will ignore the request message. Otherwise, the ATR with bring up a connection to the sector with the destination PN. And. through the connection to the destination sector, the ATR will get the measurement information (such as the received ATR SNR) from the destination T-BTS.

Based on the received information, such as RoT, SNR etc., the ATR will send an offer message back to the UWBTS with the rate and duration information to indicate how much ATR backhaul traffic could be supported by this ATR. Once the offer is accepted by the UWBTS, backhaul flow parameters, including QoS, are negotiated and the ATR backhaul enabled.

Figure 6:
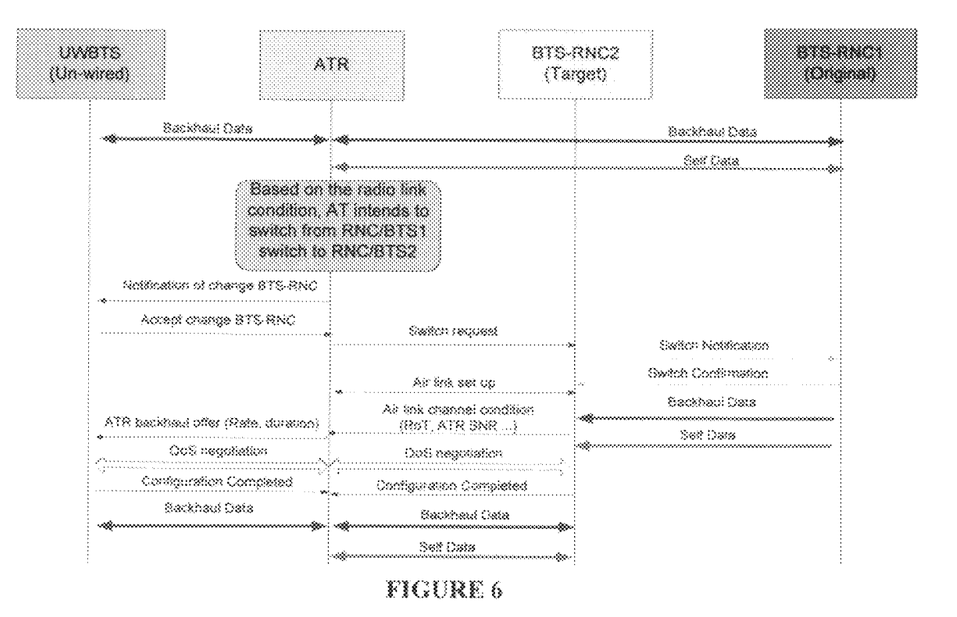
FIG. 6 shows the various network elements that form a mesh network in the 802.11s standard

An ATR may switch among UWBTSs and T-BTSs independently, based on various factors such as a change of the air link conditions. For the case of an ATR initiated T-BTS switch, which is illustrated in FIG. 6, if the ATR currently has a connected backhaul for a UWBTS and a original T-BTS (shown in the figure as "BTS-RNC1"), and if the channel condition of the air link between the ATR and current T-BTS is deteriorated, the ATR may send a request to switch to another T-BTS. The source UWBTS should be notified first. After the UWBTS acceptance of a change of T-BTSs is received at the ATR, the ATR will send the switch request to a target T-BTS (shown in the figure as BTS-RNC2).

As between the ATR and the UWBTS, either may request to disconnect an existing ATR backhaul connection between them. If the disconnection is initiated by the ATR, the UWBTS may try to negotiate another ATR backhaul before it accepts the disconnection request (i.e., establish a make before break connection).

Upon disconnecting the link between the UWBTS and the ATR, the ATR may also request to disconnect its connection to the T-BTS. Similarly, the T-BTS may request to disconnect the ATR backhaul link with a particular ATR.

For an ATR's own application traffic, the sector switching should basically follow the existing rules for handoffs. In such a switch, the ATR will always try to switch to a T-BTS (as compared to an UWBTS) as long as the channel condition meet its transmission requirements. A priority based block could be applied to the T-BTS to control the loading of the BTS-RNC The sector switching for an AT's own application traffic is independent of sector switching for the corresponding ATR's backhaul traffic. The channel conditions requirements for the AT's own traffic is relatively relaxed compared with the channel condition requirements for the ATR's backhaul traffic. More hysteresis should be applied for sector switching for the ATR's backhaul traffic than for sector switching for its own traffic. The ATR's own traffic and its backhaul traffic may be sent to different links to different T-BTSs. Independent Walsh codes could be applied to the different links. Independent power control and resource allocation should also be applied.

The ATR backhaul connection should be stay in the subnet where the source AT's session resides. If the source AT moves into different subnet, and the source AT is active, the ATR backhaul should stay as long as possible with the original subnet. If the subnet has to be changed, session transfer should be conducted first.

Herein, the inventors have disclosed a method and system for implementing interference cancellation with use of an access terminal router. Numerous modifications and alternative embodiments of the invention will be apparent to those skilled in the art in view of the foregoing description.

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention, and that the exclusive use of all modifications which come within the scope of the appended claims is reserved.

The invention claimed is:

1. A method comprising:
receiving, at a relay access terminal, a data transmission marked according to a timing period;
negotiating a first transmitter format and another timing period for a relay transmission associated with the data transmission;
determining a time-mark number corresponding to the another timing period;
communicating the first transmitter format, the another timing period and the time-mark number to a source base station and a plurality of additional base stations determined to be subject to interference from the relay transmission, wherein the time-mark number and the another timing period are applied for interference cancellation of signals corresponding to the time-mark number;
communicating the relay transmission using the first transmitter format and the another timing period;
proposing, via a multicast transmission from the relay access terminal, a second transmitter format for communicating the relay transmission and the another timing period to the source base station and the plurality of additional base stations determined to be subject to interference from the relay transmission; and
receiving, at the relay access terminal, an acceptance for communicating the relay transmission using the second transmitter format.

2. The method of claim 1, further comprising storing the time-mark number.

3. The method of claim 1, further comprising receiving a backhaul transmission request from a base station lacking backhaul capabilities.

4. The method of claim 3, wherein the data transmission is a backhaul transmission from a base station lacking backhaul capabilities.

5. The method of claim 4, further comprising determining whether to accept the data transmission for an associated relay transmission.

6. A wireless communications system comprising:
a relay access terminal configured to:
receive, at a relay access terminal, a data transmission marked according to a timing period;
negotiate a first transmitter format and another timing period for a relay transmission associated with the data transmission;
determine a time-mark number corresponding to the another timing period;
communicate the first transmitter format, the another timing period and time-mark number to a source base station and a plurality of additional base stations determined to be subject to interference from the relay transmission, wherein the time-mark number and the another timing period are applied for interference cancellation of signals corresponding to the time-mark number;

communicate the relay transmission using the first transmitter format and the another timing period;

propose, via a multicast transmission from the relay access terminal, a second transmitter format for communicating the relay transmission and the another timing period to the source base station and the plurality of additional base stations determined to be subject to interference from the relay transmission; and receive, at the relay access terminal, an acceptance for communicating the relay transmission using the second transmitter format.

7. The wireless communications system of claim 6, wherein the source base station is configured to apply the time-mark number and the another timing period for interference cancellation of signals corresponding to the time-mark number.

8. The wireless communications system of claim 7, wherein the source base station is further configured to store the time-mark number.

9. The wireless communications system of claim 6, wherein the relay access terminal is further configured to receive a backhaul transmission request from a base station lacking backhaul capabilities.

10. The wireless communications system of claim 9, wherein the data transmission is a backhaul transmission from a base station lacking backhaul capabilities.

11. The wireless communications system of claim 10, wherein the relay access terminal is further configured to determine whether to accept the data transmission for an associated relay transmission.

12. The wireless communications system of claim 8 wherein the source base station is configured to provide the time-mark number to at least one neighboring base station of the relay access terminal, and further wherein the at least one neighboring base station is configured to apply the time-mark number and the another timing period received from the relay access terminal for interference cancellation respecting signals received as a result of a transmission between the relay access terminal and a target base station, the transmission corresponding to the time-mark number.

13. The wireless communications system of claim 6 wherein a same average transmission rate is maintained for end-to-end transmission from the source base station, via the relay access terminal, to a target base station.

14. The wireless communications system of claim 6 wherein the first transmitter format and the another timing period provided by the relay access terminal includes coding and modulation parameters.

15. The wireless communications system of claim 12 wherein the source base station is configured to notify the at least one neighboring base station of a pending relay transmission via the relay access terminal.

16. The method of claim 1 wherein the time-mark number is provided to at least one neighboring base station of the relay access terminal, and further wherein the at least one neighboring base station applies the time-mark number and the another timing period received from the relay access terminal for interference cancellation respecting signals received as a result of a transmission between the relay access terminal and a target base station, the transmission corresponding to the time-mark number.

17. The method of claim 1 wherein a same average transmission rate is maintained for end-to-end transmission from the source base station, via the relay access terminal, to a target base station.

18. The method of claim 1 wherein the first transmitter format and the another timing period provided by the relay access terminal includes coding and modulation parameters.

19. The method of claim 16 wherein the at least one neighboring base station is notified by the source base station of a pending relay transmission via the relay access terminal.

* * * * *